(12) United States Patent
Thomas et al.

(10) Patent No.: US 8,347,823 B1
(45) Date of Patent: Jan. 8, 2013

(54) PET TRIGGERED PROGRAMMABLE TOY

(76) Inventors: Roy Justin Thomas, Fife, WA (US); Robert Barry Bonnell, Redmond, WA (US)

( * ) Notice: Subject to any disclaimer, the term of this patent is extended or adjusted under 35 U.S.C. 154(b) by 27 days.

(21) Appl. No.: 12/830,153

(22) Filed: Jul. 2, 2010

Related U.S. Application Data

(60) Provisional application No. 61/270,310, filed on Jul. 7, 2009.

(51) Int. Cl.
*A01K 29/00* (2006.01)

(52) U.S. Cl. .................................................. 119/707

(58) Field of Classification Search .............. 119/707, 119/702, 708, 710, 711; 340/573.1, 573.3; 446/175, 484, 485; 362/259, 276, 394
See application file for complete search history.

(56) References Cited

U.S. PATENT DOCUMENTS

| | | | | |
|---|---|---|---|---|
| 2,838,876 | A * | 6/1958 | Smith, Jr. ...................... | 180/2.2 |
| 2,896,131 | A * | 7/1959 | Schumann .................... | 361/179 |
| 4,201,012 | A * | 5/1980 | Marshall ....................... | 446/175 |
| 4,391,224 | A * | 7/1983 | Adler ............................ | 119/707 |
| 4,479,329 | A * | 10/1984 | Fraden .......................... | 446/175 |
| 4,702,718 | A * | 10/1987 | Yanase .......................... | 446/175 |
| 4,828,525 | A * | 5/1989 | Okano .......................... | 446/175 |
| 4,924,214 | A * | 5/1990 | Hill .............................. | 340/666 |
| 5,319,531 | A * | 6/1994 | Kutnyak ....................... | 362/184 |
| 5,443,036 | A | 8/1995 | Amiss et al. | |
| 5,452,901 | A * | 9/1995 | Nakada et al. ................ | 446/454 |
| 5,533,921 | A * | 7/1996 | Wilkinson .................... | 446/409 |
| 5,604,478 | A * | 2/1997 | Grady et al. .................. | 340/330 |
| 5,692,946 | A * | 12/1997 | Ku ................................ | 446/456 |
| 5,697,829 | A * | 12/1997 | Chainani et al. .............. | 446/436 |
| 5,705,990 | A * | 1/1998 | Messier ........................ | 340/666 |
| 5,934,223 | A | 8/1999 | Ellery-Guy | |
| 6,016,771 | A | 1/2000 | Baiera et al. | |
| 6,113,252 | A | 9/2000 | Arlitt et al. | |
| 6,505,576 | B2 | 1/2003 | Nathanson et al. | |
| 6,557,495 | B2 | 5/2003 | Lorenz | |
| 6,701,872 | B1 * | 3/2004 | Allen ............................ | 119/707 |
| 6,780,077 | B2 * | 8/2004 | Baumgartner et al. ....... | 446/175 |
| 6,964,572 | B2 * | 11/2005 | Cesa ............................. | 434/258 |
| 7,057,515 | B2 * | 6/2006 | Smith et al. ................. | 340/573.1 |
| 7,617,799 | B2 | 11/2009 | Kates | |
| 7,744,441 | B2 * | 6/2010 | Sosnovskiy ................... | 446/175 |
| 2008/0011243 | A1 * | 1/2008 | Moulton ....................... | 119/707 |

FOREIGN PATENT DOCUMENTS

| | | |
|---|---|---|
| DE | 1930652 A1 | 6/2008 |
| EP | 1125695 B1 | 2/2001 |
| EP | 1125695 A2 | 8/2001 |
| EP | 1125695 A3 | 8/2001 |
| EP | 1748309 A1 | 1/2007 |

OTHER PUBLICATIONS

Becker, M and Turner, K; Pets by The Numbers; Universal Press Syndicate; Mar. 2, 2009.

* cited by examiner

*Primary Examiner* — Rob Swiatek
*Assistant Examiner* — Ebony Evans

(57) ABSTRACT

One embodiment of a pet toy having a control module, active triggering module, and passive triggering module. Our device is an interface between a pet and pet toy or other useful device. A pet can trigger at will a moving highly collimated light dot for exercise, entertainment, mental stimulation, education, and even surrogate companionship in the absence of a human caretaker. Pets that fail to learn triggering behavior will benefit from pre-set play periods as programmed or selected by their caretaker and/or passive activation such as infrared detection or another proximity sensing switch.

10 Claims, 12 Drawing Sheets

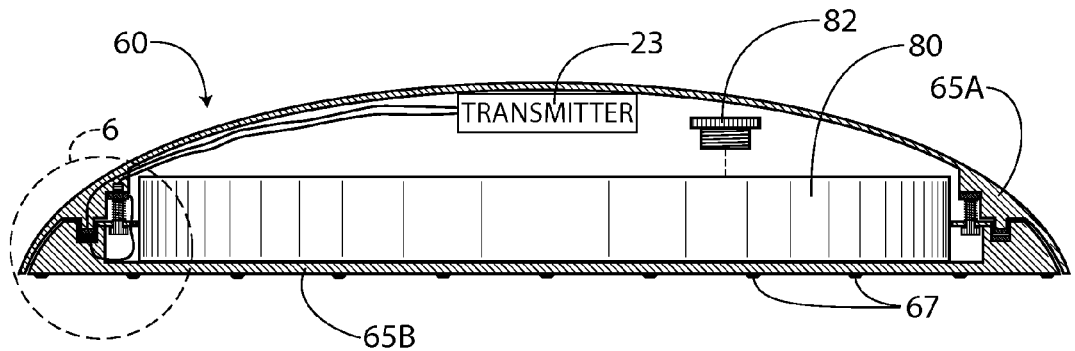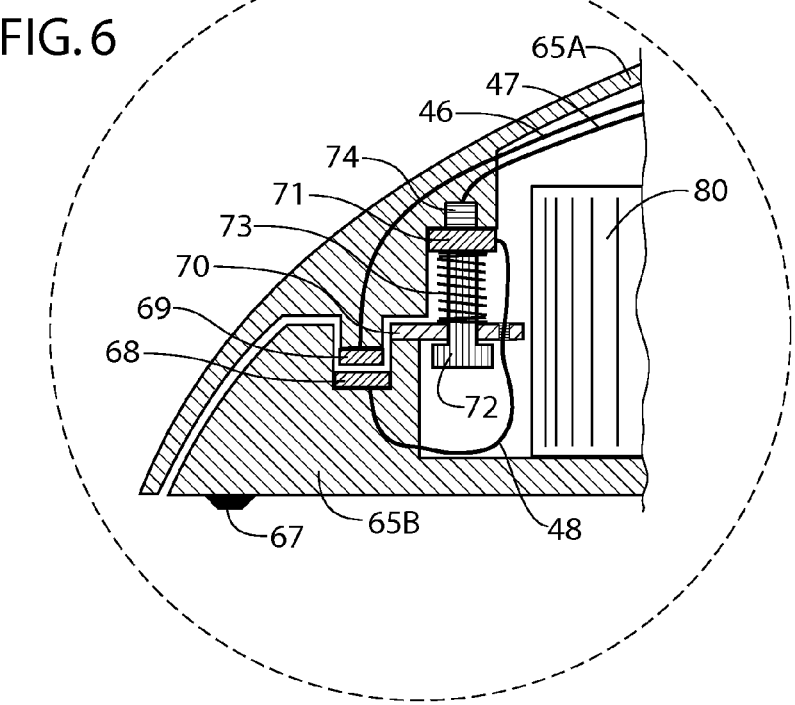

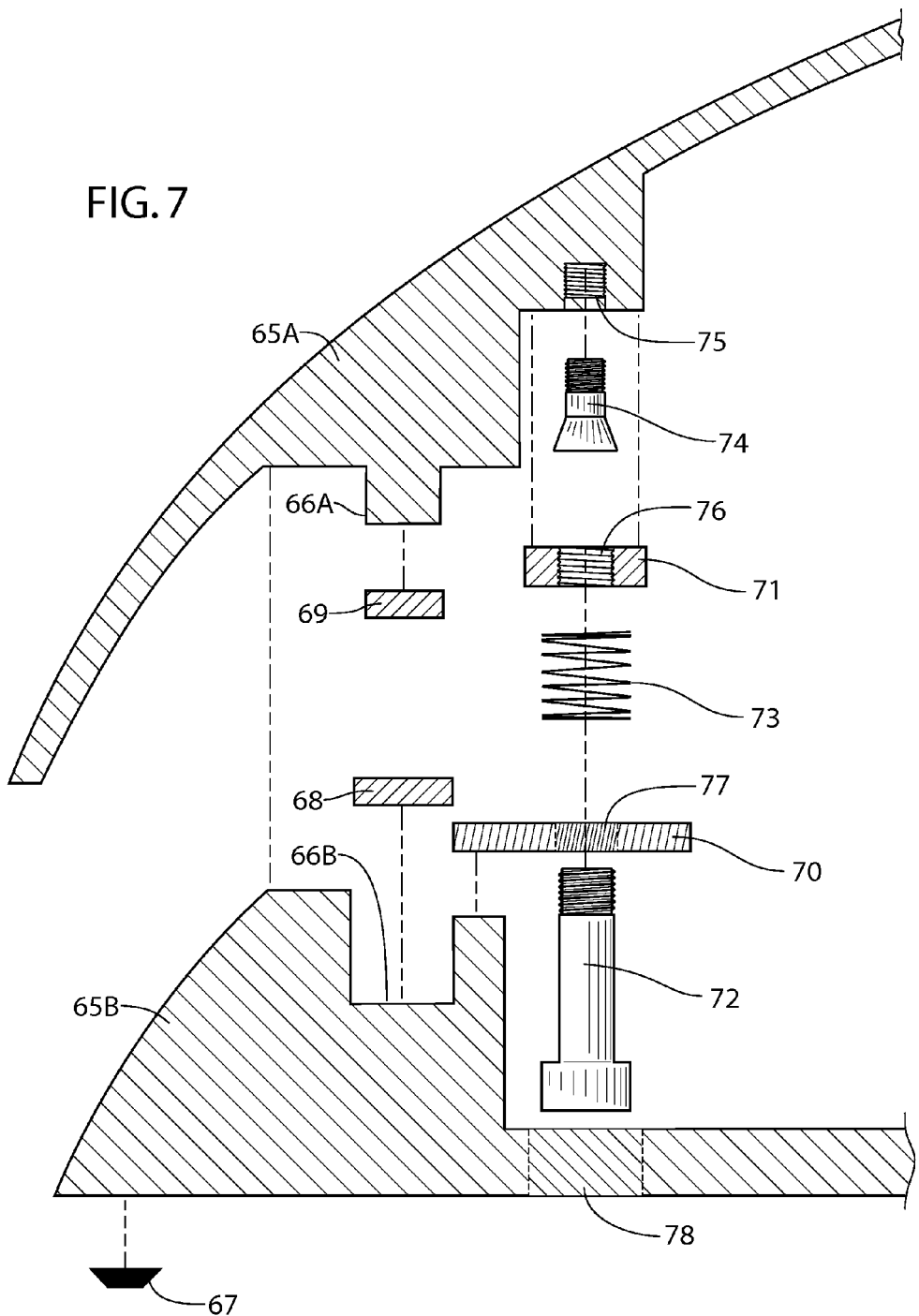

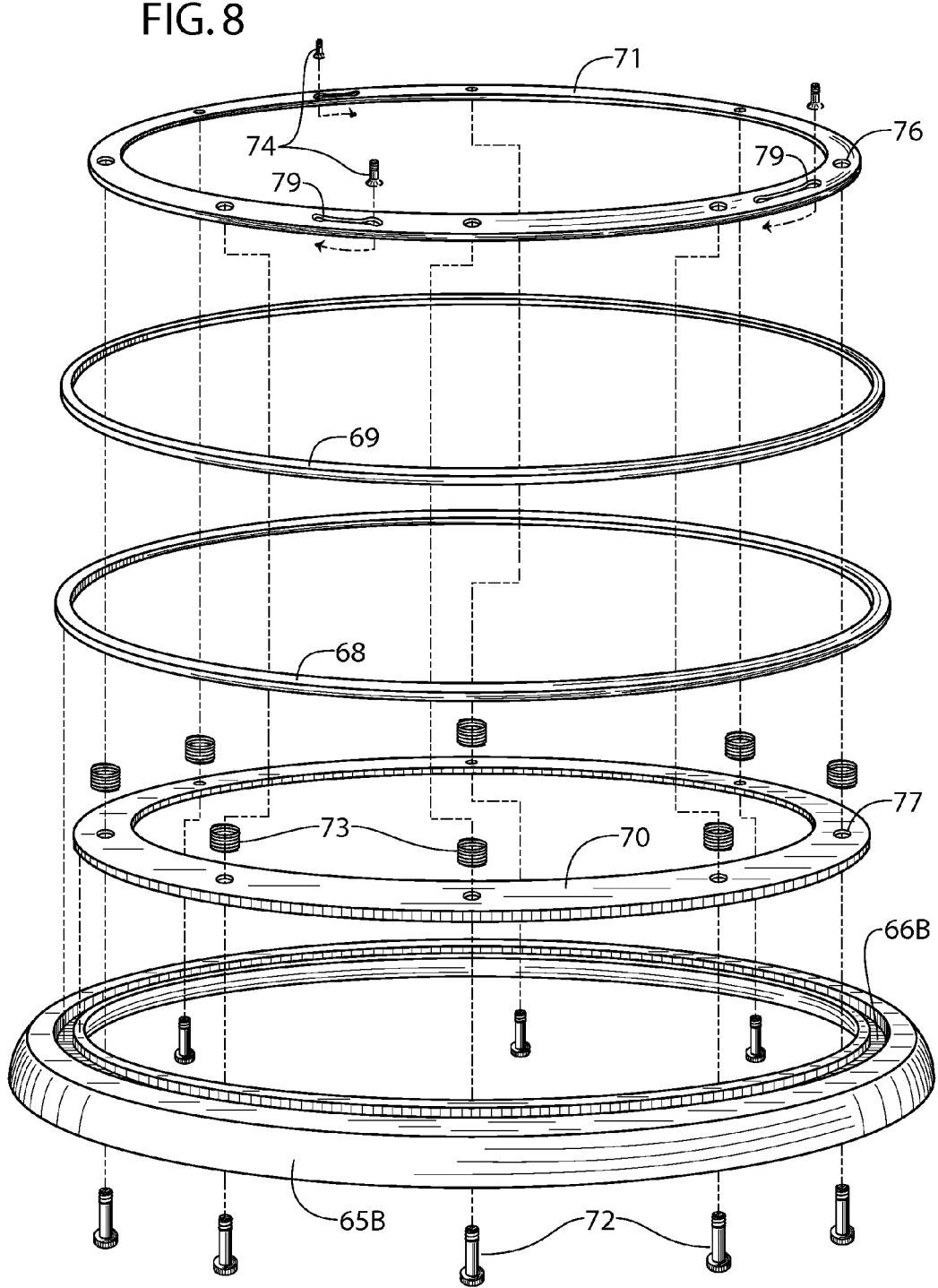

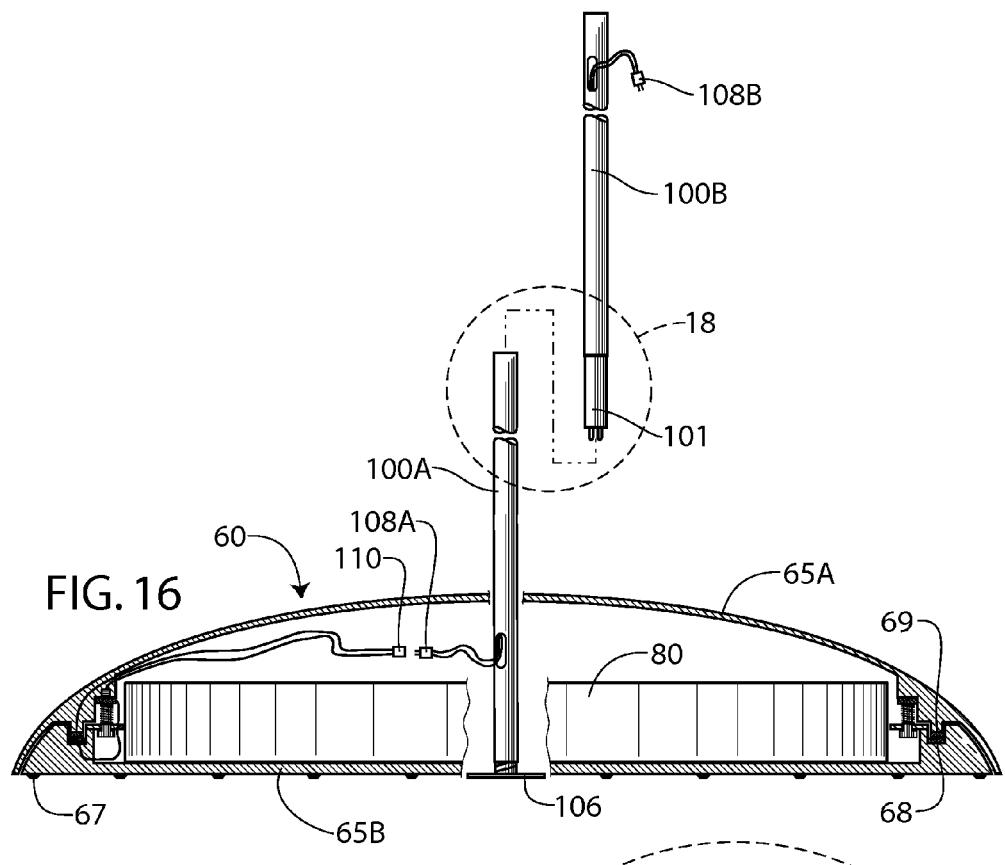
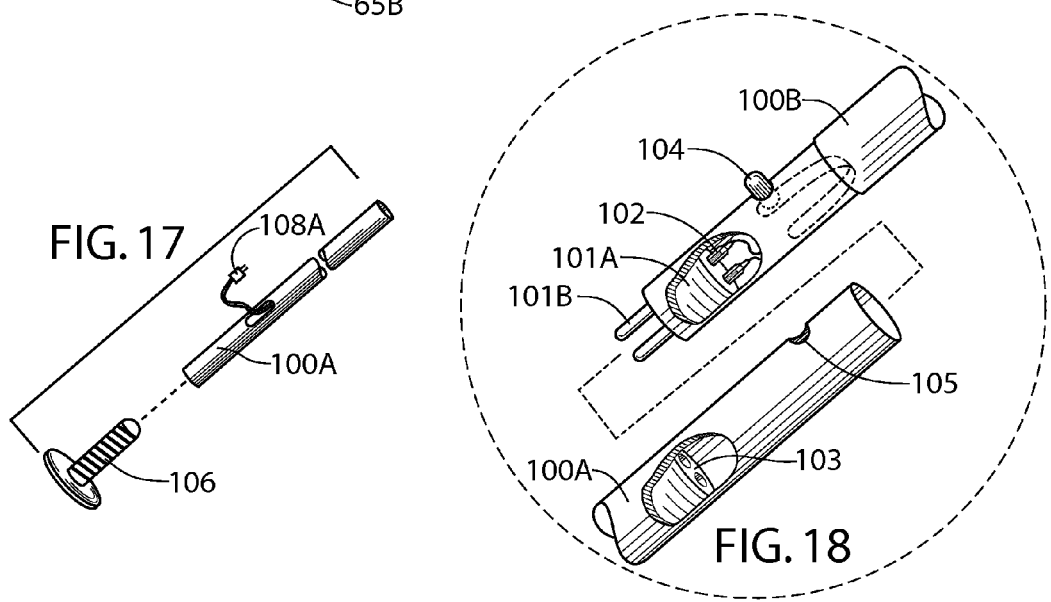

PET TRIGGERED PROGRAMMABLE TOY

CROSS REFERENCED TO RELATED APPLICATIONS

This application claims the benefit of provisional patent application filed 2009 Jul. 7, by the present inventors, U.S. Ser. No. 61/270,310. Foreign Filing License Granted: 2009 Jul. 17.

BACKGROUND

Related Art

The following is a tabulation of some related art that presently appears relevant:

U.S. patents:

| Pat. No. | Kind Code | Issue Date | Patentee |
| --- | --- | --- | --- |
| 5,443,036 | A | Aug. 22, 1995 | Amiss, et al |
| 5,934,223 | A | Aug. 10, 1999 | Ellery-Guy |
| 6,016,771 | A | Jan. 25, 2000 | Baiera, et al |
| 6,113,252 | A | Sep. 5, 2000 | Arlitt, et al |
| 6,557,495 | B2 | May 6, 2003 | Lorenz |
| 6,505,576 | B2 | Jan. 14, 2003 | Nathanson, et al |
| 7,617,799 | B2 | Nov. 17, 2009 | Kates |

European Patents:

| Pat. No. | Kind Code | Issue Date | Patentee |
| --- | --- | --- | --- |
| EP 1930652 | A1 | Jun. 11, 2008 | SCHUENGEL FRIEDRICH [DE]+ |
| EP 1748309 | A1 | Jan. 31, 2007 | HARVEY, et al |
| EP 1125695 | A2 | Aug. 22, 2001 | FUSARO; GENERAL ELECTRIC |

Non-Patent Literature Documents

Becker, M. and Turner, K.; Universal Press Syndicate, *Pets By The Numbers*, Mar. 2, 2009

Discussion of the Problem

Many pets are forced by their caretakers to spend long periods of time alone, particularly during daily work hours. Pets that are abandoned for extended periods on a daily basis, become sedentary, lethargic, and out of physical condition. Pets that spend time alone every day are sensory deprived and resort to chewing furniture, shoes, and they even chew on building structures in some cases.

Discussion of the Needs

Pets need mental stimulation in the absence of their caretakers to help stop destructive behavior. Pets also need entertainment and exercise. When pet caretakers are absent, particularly during the workday, they need a way to exercise and entertain their pets. Caretakers need an autonomous, pet activated controllable device to exercise, entertain, mentally stimulate, and educate their pets while the caretaker is at work or absent in other respects. There needs to be a simple interface between pets and devices such as pet toys.

Realizing the True Nature of Pet/Human Interaction

People fail to realize that pets have been engaging in triggering behavior since the practice of domestication began. Such behavior is evident every time a pet begs for food, or pulls a leash from the peg. Any time a pet commands the attention of a caretaker, triggering behavior is taking place, the pet triggers the caretaker to act on the pet's behalf. Failure to recognize what is really taking place between pets and their caretakers denies a whole class of capability in pets. People don't think of pets being able to turn on a TV, or to call a caretaker at work via a specially designed cell phone or on an Internet connection, but with our device; in future contemplated embodiments, that capability can be realized. Our embodiment provides an interface between pets and devices such as the hereinafter provided laser toy, or many other devices, which are otherwise unavailable to pets. Our triggering device as described herein allows pets to be exercised, entertained, mentally stimulated, and educated regardless of the presence or absence of a caretaker. Further, the device allows caretakers to interact with pets while at home, in the presence of the pet, with an optional remote trigger. Also, contemplated embodiments will allow absent caretakers to interact with their pets remotely.

Discussion of Related Art

Pets with a chase instinct love to follow a light dot projected from a laser pointer or similar intense light source. Accordingly, many types of collimated light devices have been developed to entertain and exercise pets, mostly cats and dogs. None of the devices are pet trigger-able in the sense that the pet can actually press a button to activate such devices. In each case, the devices must be human attended for at least the initiation of play, so they are not truly autonomous even though they may run automatically for a period of time. None of the devices is designed to educate pets to perform the specific behavior of actuating the device in the absence of human involvement.

An example of a pet entertainment device is found in U.S. Pat. No. 6,505,576, Jan. 14, 2003, Nathanson, et al. This device's commercial name is the "BaDa Beam Rotating Laser Cat Toy" and it projects a laser dot that moves in a circular pattern on the floor or wall to entertain cats specifically.

The Nathanson device suffers from its inability to have its factory preset period of play triggered by the pet, thus the initial toy activation and any subsequent activation is through human interaction only—rendering it not truly autonomous.

This device also suffers from being small enough for the pet to tip it over during play. It is marketed and patented as a cat-only toy because a dog or ferret would easily carry it away, or quickly break off the mirror appendage that is used to reflect the laser beam onto the floor or wall. It is also a choke hazard for dogs or other pets that tend to chew. A dog would easily chew it to pieces and possibly suffer injury or even death by ingesting shards of plastic or internal components such as batteries—hence, the cat only designation for Nathanson.

Nathanson further suffers from its low projection angle. It is designed to sit on the floor and at the first of two mirror angle settings the laser dot projects out only a few inches. In the other setting the laser dot is projected roughly parallel to the floor, exposing a pet's eyes directly to the laser light.

According to FDA classification of laser devices, Class IIIa and lower power laser pointers are safe for direct human eye exposures lasting less than 0.25 seconds. Much longer exposures to pet eyes are possible with the Nathanson device because it allows the pet to approach the device to the point of contact and stare directly into the stationary mirror. At such proximity the laser beam reflection angle is almost nil, significantly increasing the potential for a damaging eye exposure. While pet eyes have been extensively studied, the effect of direct exposure to a highly collimated light source is unknown as of this writing. Consequently, pet toys that incorporate a high intensity light source, such as a laser, should minimize eye exposure to the greatest extent possible.

Nathanson further suffers from design deficiencies. The laser is mounted on a rotating platform wheel, necessitating slip ring contacts to provide power to the laser. Slip ring contacts are by their nature problematic. The motor is mechanically connected to the rotating laser platform via a drive belt and motor shaft friction pulley, which complicates the design unnecessarily. The friction pulley will wear the rubber drive belt prematurely, causing failure. This reduction drive system provides a pulley ratio that results in the laser dot moving much too fast for pets to effectively chase, rendering ineffective the goal of exercise. Since the dot moves so fast, pets simply sit and wait for it to come back and then slap or snap at it in passing.

The reduction drive system also allows the motor to run at high speed causing a significant amount of noise, which attracts the pet to very close proximity out of curiosity regarding the noise. This attraction is detrimental to the objective of the device because the pet is highly likely to tip the device over or slap the hinged cover closed, ending play. Pets that are enticed by noise to approach the device might suffer prolonged eye exposure.

A similar device is commercially available known as the "FroliCat™ Bolt." The "Bolt" claims "patent applied for" status on its packaging, however, our search failed to reveal a patent application. We include "Bolt" here to make sure that we are covering the most relevant devices.

The "Bolt" device works in a nearly identical fashion to the Nathanson BaDa Beam. Instead of belt driven pulleys, as in Nathanson, FroliCat™ Bolt uses a reduction-geared motor to rotate the laser, but in other respects it is identical. The laser fires through an aperture to reflect off of a user settable angled mirror fastened on an indexed pivot. The device projects a laser dot moving in a circular pattern on the floor for entertaining cats specifically.

"Bolt" suffers from the same failings as "BaDa Beam:"
(a) Human attendance and monitoring are required.
(b) Neither device is pet trigger-able.
(c) Both have a low angle of projection causing likely eye exposure.
(d) They are small and tip-able.
(e) They are easily carried away by larger pets.
(f) They are noisy, attracting the pet to the device in a detrimental way, allowing the pet to knock it over or possibly suffer eye exposure.
(g) A chewing pet could eat them suffering injury or possible death.
(h) The laser dot moves so fast that a pet cannot chase it effectively, which causes the pet to sit in one place and swat at the dot as it passes. This defeats the exercise purpose of both devices, rendering them entertainment only devices.
(i) There is no provision for education as there is no way for the pet to learn triggering behavior.
(j) There is no provision for user programming or control other than on/off.

The list above generally applies to all pet laser toy devices and shows that they all fall short of our stated goal of providing a device interface that will exercise, entertain, mentally stimulate, and educate pets without the need of human involvement. Of course, a human is needed to purchase and set up the device, but thereafter the pet can choose to trigger the device at any time, regardless of the presence or absence of a human caretaker.

Triggering is important learned behavior in that it allows many other devices to be similarly designed to take advantage of such learning. For example, a pet with triggering ability would be able to open an exit door at will, fill a feeding station, play with other toys, or activate any number of other devices to allow pet caretakers to more easily care for their pets, and to allow pets to better take care of themselves.

Another example of a related device is found in U.S. Pat. No. 7,617,799, Jan. 14, 2003, Kates. This device is dependent on an instrumented collar to communicate with various devices. A complex and expensive computer interface is required to provide control to prevent overreaching with respect to feeding stations and overexertion with respect to toys. Also, a punishment device (claim 38) is incorporated in the collar that administers electric shocks to the animal's neck in the event that the computer system detects bad behavior in spite of the following statement by Kates: "Moreover, it is well known that punishment training is a poor method of training and often leads to behavioral problems." Even though Kates describes punishment devices in such terms, he nevertheless incorporates a shock feature in his own device.

The term "computer system" appears no less than nine times in the very first claim and the terms "computer system" or "computer-controlled" appear 30 times throughout the claims indicating that Kates is a computer dependent system.

All aspects of Kates are designed to provide "feedback to the training system" further depending on the computer system and not training direct interaction of the pet with any device.

Kates is impractically complex describing accelerometers, gyroscopes, radio frequency identification (RFID), global positioning system (GPS), vibrators, acoustics, location tracking, and "Inertial Motion Units" among other things. To incorporate more than one or two of the devices described, the collar would have to be massive and impossible to reduce to practice. Systems in Kates are only provided for the user to communicate or interact with the computer, never the pet.

SUMMARY

In accordance with one embodiment a triggering module is provided as an interface between a pet and a device, to allow pets to self-initiate interaction with a controllable toy for example, such as the laser toy described herein, or any number of devices, for exercise, entertainment, mental stimulation, and education, regardless of the presence or absence of a human caretaker.

Advantages

Accordingly, several advantages of one or more aspects are as follows: to provide a device that activates by involvement of the pet, either directly by pressing the contact surface of a switch, or passively by approaching the device within proximity sensor range, enabling the pet to self exercise, self entertain, be mentally stimulated, and be educated to triggering behavior, regardless of the presence or absence of any human caretaker. Further, to provide a device that minimizes health concerns with design considerations to that end, for example, a device that is not easily carried away, and is not easily chewable, and which minimizes exposure of pet eyes to intense light for extended periods. Other advantages of one or more aspects will be apparent from a consideration of the drawings and ensuing description.

DRAWINGS

Figures

In the drawings, some closely related components have the same number but different alphabetic suffixes. Further, the present embodiment may take various forms in aesthetics, shapes, materials, and methods so the drawings are only for the purpose of illustration and are not to be construed as limiting any embodiment.

FIG. 5 shows a partial section view of the trigger module along line 5 as indicated in FIG. 4.

FIG. 6 shows an enlargement of the trigger module section defined by a callout circle (6) from FIG. 5 and includes details of a switch with it's associated electrical connections, and suspension system.

FIG. 7 is an enlarged and exploded view of FIG. 6.

FIG. 8 is an exploded perspective view of the trigger module bottom half with its associated rings comprising a switch and mounting system assembly.

FIG. 16 is a side elevation view with the trigger module partially sectioned showing an alternate embodiment support pole system.

FIG. 17 is a perspective view of the alternate embodiment support pole mounting system showing fastening means (106).

FIG. 18 is an enlarged, cutaway, side elevation view defined by the callout circle (18) from FIG. 16 and shows the alternate embodiment support pole mounting system center connecting plug.

Figure 1:
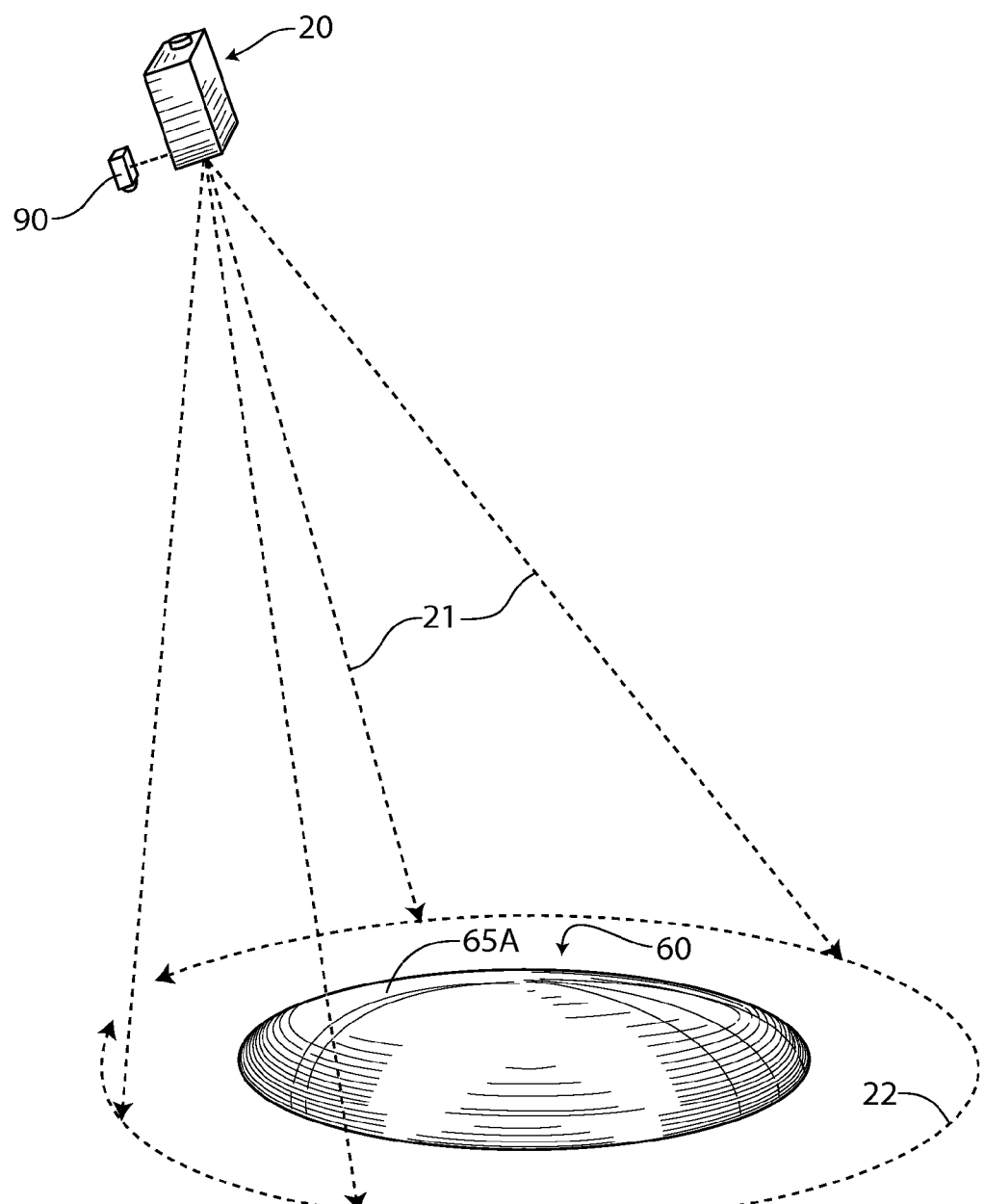
FIG. 1 is a perspective view of an embodiment of a pet/device interface or trigger module with an associated highly collimated light dot projection device or laser control module suspended above. Dashed lines and direction of movement arrows indicate a simplified projected laser pattern.
Figure 2:
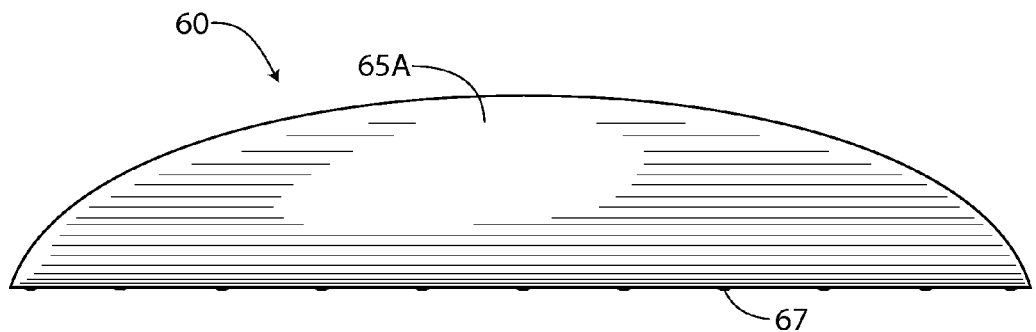
FIG. 2 shows a side elevation view of the trigger module.
Figure 3:
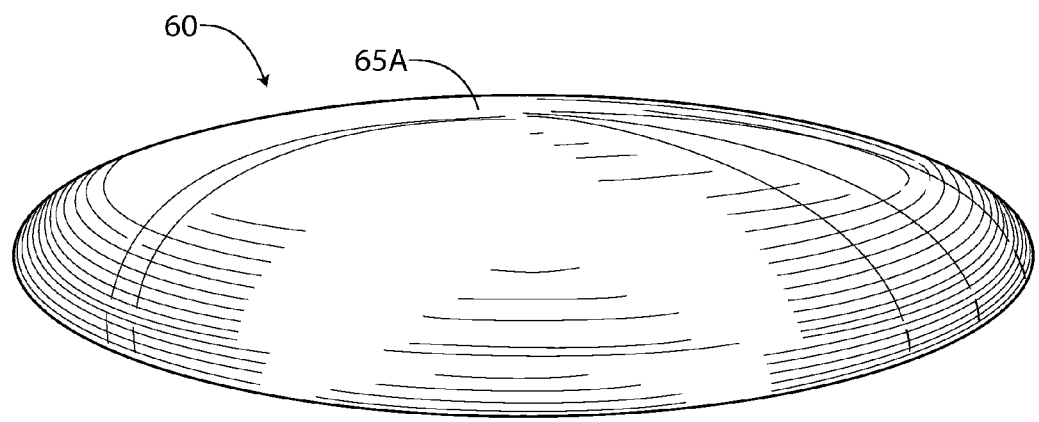
FIG. 3 shows a perspective view of the trigger module.
Figure 4:
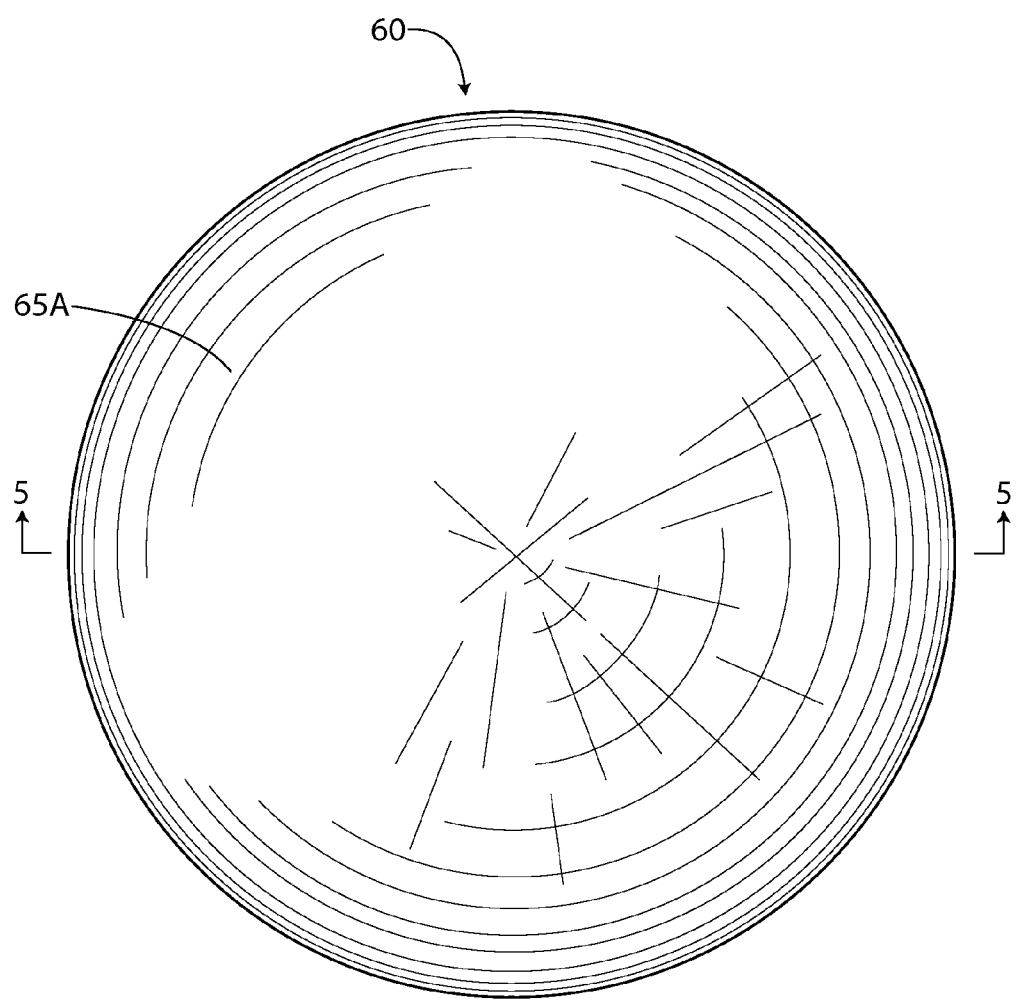
FIG. 4 shows a plan view of the trigger module.

| Drawings - Reference Numerals | |
|---|---|
| 1 | FIG. 1 Control Module and Trigger Module Perspective View |
| 2 | FIG. 2 Trigger Module Side Elevation View |
| 3 | FIG. 3 Trigger Module Perspective View |
| 4 | FIG. 4 Trigger Module Plan View |
| 5 | Arrowed Section Line - Reference to FIG. 5 - Page 4/6 |
| | FIG. 5 Trigger Module Partial Section View Along Line 5 from FIG. 4 |
| 6 | Dashed Line Callout Circle Defining Section expanded in FIG. 6 |
| | FIG. 6 - Trigger Module Section Enlargement Defined by Callout circle 6. Side elevation view. |
| 7 | FIG. 7 Upper and Lower Contact Rings Perspective View |
| 8 | FIG. 8 Trigger Module Lower Half Perspective View with Rings (contact and mounting rings) |
| 9 | FIG. 9 Mounting Ring with Callout Circle (10) to Reference FIG. 10 |
| 10 | Dashed Line Callout Circle Defining Section Enlarged in FIG. 10 |
| | FIG. 10 Dashed Line Callout Circle Defining Section Enlarged in FIG. 10 |
| 11 | FIG. 11 Ballast Tank Perspective View Shown with Trigger Module Bottom Half (65B) |
| 12 | FIG. 12 Laser Control Module Perspective View with Cutout |
| 13 | FIG. 13 Laser Control Module Perspective View Showing Control Panel |
| 14 | Arrowed Section Line - Reference to FIG. 14 |
| | FIG. 14 Laser Control Module Control Panel Side Elevation View |
| 15 | FIG. 15 Trigger Module Plan View Showing Vertical Support Pole Cross section |
| 16 | FIG. 16 Vertical Support Pole Side Elevation View |
| 17 | FIG. 17 Threaded Plug for Vertical Support Pole - Perspective View |
| 18 | Dashed line Callout Circle Defining Section Enlarged in FIG. 18 |
| | FIG. 18 Enlarged Perspective View of Vertical Support Pole Center Connection Defined by Callout 18 |
| 19 | FIG. 19 Laser Control Module Control Panel Side Elevation - Alternative Embodiment |
| 20 | Laser Control Module (Arrowed Assembly) |
| 21 | Light Beam |
| 22 | Laser Dot Path |
| 23 | Transmitter |
| 24 | Control Board - Laser, Motor, Timer, Passive Infrared Sensor (PIR) |
| 25 | Receiver Board |
| 26 | Voice Record/Playback with Programmed Routine Timer Board |
| 27 | Mounting Post for Circuit Board |
| 28 | Laser |
| 29 | Motor |
| 30 | Mirror |
| 31 | Loudspeaker |
| 32 | Battery Cover |
| 33 | Battery |
| 34 | Control Panel |
| 35 | Session Timer Control Knob |
| 36 | Slide Switch - Species (Dog/Cat in the present embodiment) |
| 37 | Slide Switch - Age (Old/Young) |
| 38 | LED on indicator |
| 39 | Main Power Switch (Toggle) |
| 40 | Slide Switch (Routine Selector) |
| 41 | Push Button (Record) |
| 42 | Push Button (Playback) |
| 43 | Microphone |
| 44 | Aperture Hole |
| 45 | Not Used |
| 46 | Electric Wire - Upper Contact Ring to Transmitter Trigger Positive |
| 47 | Electric Wire - Mounting Lug to Transmitter Trigger Negative |
| 48 | Electric Wire - Lower Contact Ring to Mounting Ring |
| 49 | Not Used |
| 50 | Scroll UP Button |
| 51 | Scroll DOWN Button |
| 52 | Scroll LEFT Button |
| 53 | Scroll RIGHT Button |
| 54 | ENTER Button - Also serves as on/off button when held down |
| 55 | LCD - Liquid Crystal Display Screen |
| 56 | Not Used |
| 57 | Not Used |
| 58 | Not Used |
| 59 | Not Used |

-continued

Drawings - Reference Numerals

| | |
|---|---|
| 60 | Trigger Module (Arrowed Assembly) |
| 65A | Trigger Module Top Half |
| 65B | Trigger Module Bottom Half |
| 66A | Alignment Protrusion Molded Into Trigger Module Top Half |
| 66B | Alignment Channel Molded Into Trigger Module Bottom Half |
| 67 | Rubber Feet |
| 68 | Contact Ring (Lower) |
| 69 | Contact Ring (Upper) |
| 70 | Guide Ring |
| 71 | Mounting Ring |
| 72 | Mounting Bolt |
| 73 | Spring |
| 74 | Mounting Lug |
| 75 | Threaded Hole in Trigger Module Top Half (65A) for Mounting Lug (74) |
| 76 | Threaded Hole in Mounting Ring (71) |
| 77 | Hole in Guide Ring (70) |
| 78 | Hole in Trigger Module Bottom Half to Pass Through Mounting Bolt (72) |
| 79 | Keyway in Mounting Ring - for Mounting Lug (74) |
| 80 | Ballast Tank - Water or Sand |
| 81 | Threaded Hole in Ballast Tank for Stopper (82) |
| 82 | Threaded Plug - Stopper for Ballast Tank |
| 83 | Not Used |
| 84 | Not Used |
| 85 | Not Used |
| 86 | Not Used |
| 87 | Not Used |
| 88 | Not Used |
| 89 | Not Used |
| 90 | Passive Infrared Sensor (PIR) Module |
| 91 | Not Used |
| 92 | PIR Lens |
| 93 | Not Used |
| 94A | PIR Mounting Rail - Male - Laser Control Module Side (electrical connections not shown) |
| 94B | PIR Mounting Rail - Female - PIR Module Side (electrical connections not shown) |
| 95 | 95 - Not Used |
| 96 | PIR Snap Catch Release Lever |
| 97 | Not Used |
| 98 | Not Used |
| 99 | Not Used |
| 100 | Vertical Support Pole Plan View Cross Section |
| 100A | Vertical Support Pole Bottom Half |
| 100B | Vertical Support Pole Top Half |
| 101A | Male Plug on Tube 100B - Center Connector |
| 101B | Pins - Male Plug Center Connector |
| 102 | Electrical Connectors - Blade Type - Wires Attached |
| 103 | Female Plug Insert in Vertical Support Pole Bottom Half (100A) |
| 104 | Spring Button |
| 105 | Hole for Spring Button in Vertical Support Pole Bottom Half (100A) |
| 106 | Threaded Plug - Male for Securing Vertical Support Pole to Trigger Module Bottom Half |
| 107 | Not Used |
| 108A | Electrical Connecting Plug - Male - For Vertical Support Pole Bottom Half (100A) |
| 108B | Electrical Connecting Plug - Male - For Vertical Support Pole Top Half (100B) |
| 109 | Not Used |
| 110 | Electrical Connecting Plug - Female |

DETAILED DESCRIPTION

FIGS. 1-14—First Embodiment

One embodiment is illustrated in FIG. 1 wherein a highly collimated light dot projection device or laser control module (20) is shown in a perspective view suspended above a pet play area defined by a laser dot path shown as a dashed circle (22). The laser dot path can be any shape, including a straight line, but is shown in FIG. 1 as a circle for clarity and simplicity. Dashed lines (21) indicate various positions of a laser beam at any given moment as it moves around a play area. A pet/device interface or trigger module (60) shown in perspective is centrally located in a pet play area and shows a switch contact surface or trigger module top half (65A) which serves as the pet contact portion of a unique normally open, single pole, single throw, momentary closed, push button.

Further, in FIG. 1, a passive pet/device interface or passive infrared module (90) is shown detached from laser control module (20) where it is removably affixed to provide optional passive infrared sensing of pets entering the play area. Passive infrared module (90) is provided in the event that pets fail to learn triggering behavior, either from a lack of aptitude or from a lack of effective training by the pet's caretaker. Infrared detection is indicated in this embodiment, however, other methods of passively sensing a pet entering the play area could be utilized and infrared sensing should not be construed as to limit the embodiment.

FIGS. 2 and 3 show a side elevation and perspective elevation of the trigger module (60) respectively. While a domed disk shape is contemplated for the contact surface in the present embodiment, other shapes can be used as well and the shape should not be construed as limiting the scope of any embodiment. Trigger module top half (65A) is made of any material suitable for preventing a pet from getting its teeth embedded into it. Hard plastic suffices in that regard but other materials can be used. The trigger module (60) is of sufficient size to prevent pets from moving it out of the play area by picking it up or scooting it around. The prototype embodiment has a diameter of 18 inches but could be more or less and should not be construed as limiting any embodiment. FIG. 2 also shows feet (67) that allow trigger module (60) to grip a hard surface or a carpeted play area equally well. The feet can be made of any suitable material that grips a hard surface. In the present embodiment we use soft rubber, but plastic or other materials can be used as well.

FIG. 4 is an overhead plan view of the trigger module (60) showing section line 5 to clearly reference FIG. 5.

FIG. 5 is a sectioned side elevation view of trigger module (60) showing trigger module top half (65A) and a trigger module bottom half (65B). Trigger module bottom half (65B) serves as a main support structure for all components including a ballast tank (80) which provides additional weight to prevent pets from picking up or scooting trigger module (60). Ballast tank (80) is provided with a threaded plug (82) to stopper an opening in the top of ballast tank (80), which is to be filled with water, sand, or any suitable ballast material, by an end user. Ballast tank (80) can be made of any suitable material that will effectively contain said ballast material without spilling. Trigger module top half (65A) is fastened to trigger module (60) so that it is easily removed for filling ballast tank (80) and for installing batteries in a transmitter (23).

With further reference to FIG. 5, mounted to the underside of trigger module top half (65A) is transmitter (23), which provides a method of relaying a pet's triggering of the trigger module (60) via radio pulse to laser control module (20—not shown in this view). Radio is indicated in this embodiment because it will pass a trigger pulse through the wall of trigger module top half (65A) as well as through a pet which may occlude other transmission devices preventing the trigger pulse from reaching the laser control module (20—not shown in this view).

Also with reference to FIG. 5, trigger module top half (65A) is easily removable to facilitate filling ballast tank (80) and installing batteries in transmitter (23).

Callout circle 6 defines the detail of FIG. 6.

FIG. 6 is an enlarged section view of callout circle 6 from FIG. 5, and shows the electrical connection and suspension systems of trigger module (60). Trigger module top half (65A) is shown extending down over trigger module bottom half (65B) in a "skirt" arrangement to eliminate any seams on the outside. Seams presented to the outside of trigger module (60) would allow a pet to get a tooth or claw into trigger module (60).

With further reference to FIG. 6, contact ring (lower) (68) is fastened by adhesive or mechanical means into a channel provided for it in trigger plate bottom half (65B) and serves as the negative side electrical contact of a push button switch, which is the purpose of trigger module (60). Contact ring (upper) (69) is fastened by adhesive or mechanical means to a protrusion provided for it in trigger plate top half (65A) and serves as the positive side electrical contact of a push button switch. Contact rings (65A&B) are full circles made of any electrically conductive material. The prototype embodiment enlists aluminum tape but any suitable material including metal impregnated plastic may be used. Contact rings (68 & 69) are held open by spring (73) of which there are eight total in this embodiment. A prototype embodiment utilized only five springs and the number of springs is only related to the weight of trigger module top half (65A) so more or fewer springs may be used.

With continued reference to FIG. 6, spring (73) can be made of any suitable material and in this embodiment a conventional coil spring of tensile steel is used but a plastic coil or a leaf spring could be utilized in alternate embodiments. Spring (73) is held in place by mounting bolt (72) and in this embodiment each spring has it's own bolt in a coil-over-bolt arrangement. Mounting bolt (72) is smooth shafted, threaded at its end, can be made of metal or plastic or any suitable material, and is intended to secure a mounting ring (71) to trigger plate bottom half (65B).

Also referencing FIG. 6, guide ring (70) is shown as a separate ring to allow for ease of injection molding of trigger module bottom half (65B) but in a prototype embodiment we used stereolithography to make the trigger module. Such considerations as mold release are unnecessary with that particular method of production, and guide ring (70) can be incorporated integrally when molding processes like stereolithography are utilized. Depending on the mode of manufacture, guide ring (70) can be included as a solid part of trigger module bottom half (65B) or as a separate part. In this embodiment, guide ring (70) is fastened to trigger module bottom half (65B) with adhesive or any suitable fastening means, and allows mounting bolt (72) to slide up and down in pass-through holes associated with each bolt. The head of mounting bolt (72) is of sufficient diameter to prevent it from passing through guide ring (70) effectively making the top and bottom halves one unit. Mounting bolt (72) is fastened with threads (not shown in this view) into mounting ring (71).

With further reference to FIG. 6, mounting ring (71) is made of any suitable electrically conductive material, similar to contact rings (68 & 69), and is also a full circle that is fastened to trigger module top half (65A) via a mounting lug (74) which is obscured in this view but shown in FIG. 7. Mounting lug (74) is a bolt but has a conical shaped head with a threaded shaft to securely fasten into trigger module top half (65A). Mounting lug (74) is made of electrically conductive material so that electrical connection is made through mounting ring (71) to contact ring (lower) (68) via electrical wire (48). The mounting lug's conical head fits into a keyway (shown in FIGS. 8,9&10). Three mounting lugs are provided in the present embodiment to make sure that trigger module top half (65A) is securely fastened to trigger module bottom half (65B), however, more or fewer lugs and keyways can be used. This system is designed to allow easy removal of trigger plate top half (65A) for filling of ballast tank (80) and installing batteries in transmitter (23) (not shown in this view). Electric wire (46) is provided to electrically connect contact ring (upper) (69) to the positive side of transmitter (23—not shown in this view). Electrical wire (47) is provided to electrically connect mounting lug (74) to the negative side of transmitter (23—not shown in this view). Electric wire (48) is provided to electrically connect contact ring (lower) (68) to mounting ring (71) and thence, through mounting lug (74) to electric wire (47) ultimately completing a connection with transmitter (23—not shown in this view).

FIG. 7 is an enlarged, exploded, side elevation view of FIG. 6 and provides greater detail of the electrical and suspension system of trigger module (20). Mounting bolt (72) is passed through its associated hole (78) in trigger module bottom half (65B), then passed through its associated hole (77) in guide ring (70), through its associated coil spring (73) and finally is threaded into its associated threaded hole (76) in mounting ring (71). Mounting lug (74) is threaded into its associated threaded hole (75) in trigger module top half (65A). Electrical wires (46, 47 & 48) are not shown in this view but are connected with suitable means to their associated contact rings (68 & 69) and mounting lug (74), which could include soldering, or mechanical fastening means. Contact ring (upper) (69) is fastened with adhesive or other means to its associated protrusion molded onto trigger module upper half (65A) and contact ring (lower) (65B) is fastened with adhesive or other means to its associated channel molded into trigger module bottom half (65B). Not shown in this view is keyway (79—shown in FIGS. 8, 9 & 10), which receives the conical head of mounting lug (74) to secure trigger module top half (65A) to mounting ring (71).

FIG. 8 is an exploded perspective view of the electrical and suspension system of trigger module, bottom half (65B) with its associated components, including contact ring (upper) (69) that is affixed to trigger module top half (65A—not shown in this view). Trigger module bottom half (65B) receives contact ring (lower) (68) in its associated channel (66B). Contact ring (upper) (69) is received onto its associated protrusion (66A) molded into trigger module top half (65A—not shown in this view).

Guide ring (70) is received onto trigger module bottom half (65B), fastened with adhesive or other means. Mounting bolts (72) are passed through their associated holes (77) in trigger module bottom half (65B—the entire bottom surface of the trigger module is omitted for clarity) then through their associated holes (77) in guide ring (70) then through their associated coil springs (73) and finally threaded into their associated holes (76) in mounting ring (71). Mounting lugs (74) are threaded into their associated holes (75—not shown in this view, and the entire trigger module top half 65A is omitted from this view for clarity). Mounting lugs (74) are received into their associated keyways (79). A short clockwise twist of trigger module top half (65A—omitted from this view for clarity) locks mounting ring (71) to trigger module top half (65A—omitted from this view for clarity) effectively mating trigger module top half (65A—omitted from this view for clarity) and trigger module bottom half (65B) into one unit. The result is a unique normally open, single pole, single throw, momentary closed, push button that a pet can operate easily.

Figure 9:
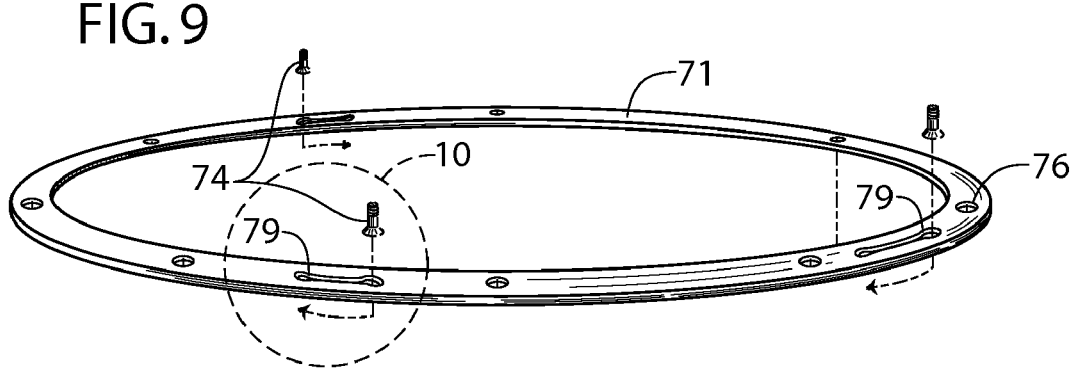
FIG. 9 shows a perspective view of the mounting ring from FIG. 8.

FIG. 9 is a perspective view of mounting ring (71) with its associated threaded holes (76), mounting lugs (74), and keyways (79). Callout circle 10 defines the area of FIG. 9 that is enlarged in FIG. 10.

Figure 10:
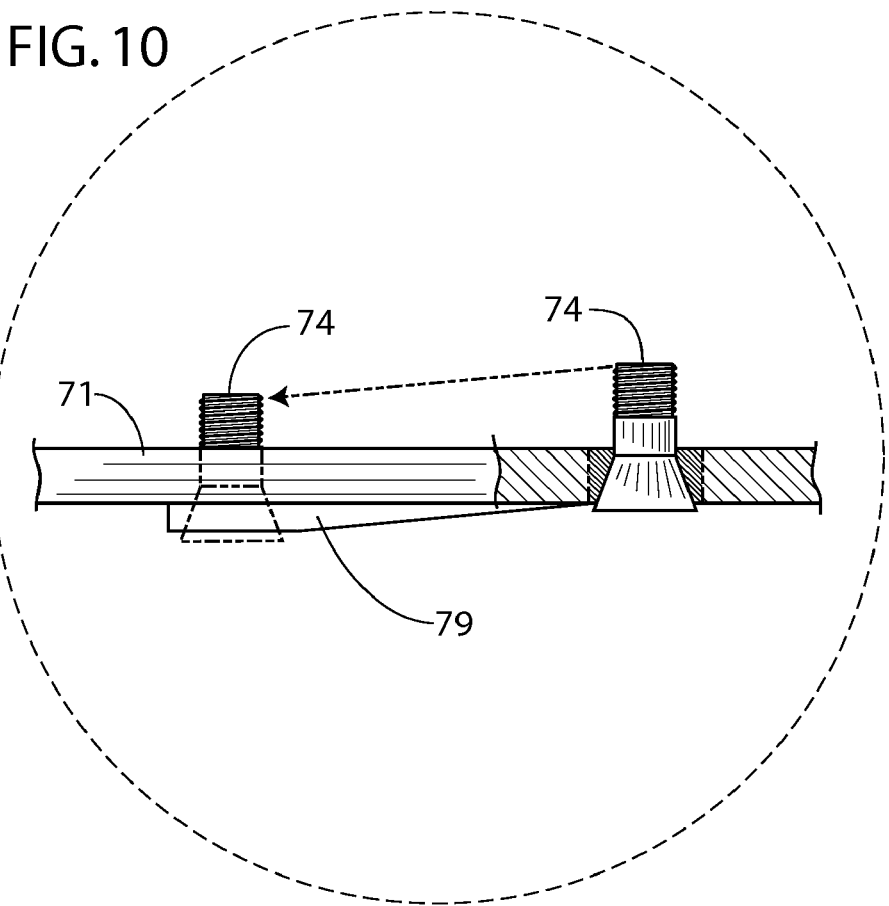
FIG. 10 is an enlarged, partially sectioned side elevation view defined by the callout circle (10) from FIG. 9 and shows a mounting lug engaging a ramped keyway that is fashioned into the mounting ring.

FIG. 10 is a side elevation, partially sectioned detail of mounting lug (74) and keyway (79). Mounting lug (74) is received into the large opening of keyway (79), which is machined, molded, or otherwise affixed to mounting ring (71). A motion arrow shows mounting lug (74) sliding along ramped keyway (79) and locking into place shown by the phantom lines of mounting lug (74) in its locked position. Again, trigger module top half (65A) is omitted for clarity but will receive in threaded holes mounting lugs (74). Various systems can be used for this purpose so the specificity of the above description should not be construed as limiting the scope of this embodiment.

Figure 11:
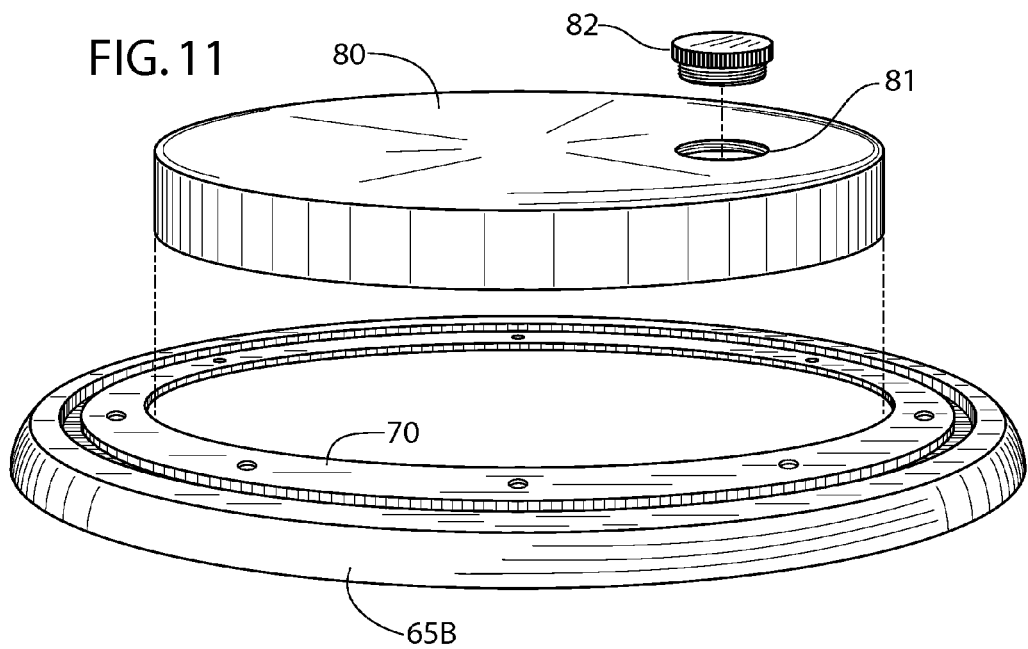
FIG. 11 shows a perspective view of a ballast tank and its associated trigger module bottom half.

FIG. 11 is a perspective view of ballast tank (80) with its threaded plug (82) and threaded hole (81). Guide ring (70) affixed to trigger module bottom half (65B) serves to center and hold ballast tank (80) in place. Ballast tank (80) will provide added strength and stability to trigger module bottom half (65B) by being fixed to the floor (not shown for clarity) of trigger plate bottom half (65B). Shipped empty, ballast tank (80) will provide additional weight to trigger module (20) when filled by the end user with water, sand, or other suitable ballast material.

Figure 12:
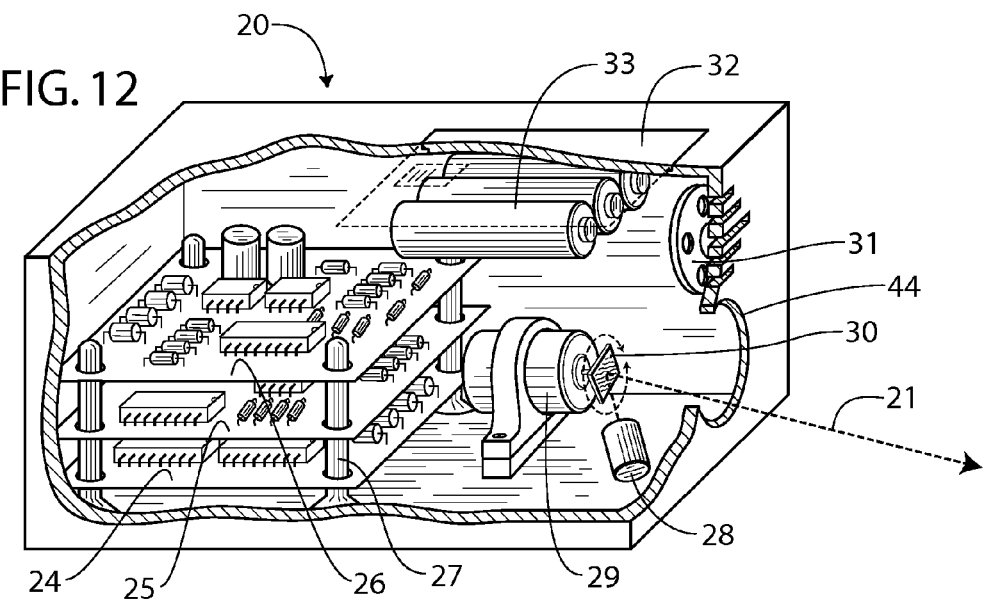
FIG. 12 shows a cutaway perspective view of a laser control module.

FIG. 12 is a perspective view of laser control module (20) and is cut away to show various components of the present embodiment. Connecting wires are omitted for clarity and the arrangement and fastening means of the components are only representative of the present embodiment and can be accomplished in various ways. Control circuit boards (24), (25), and (26) are shown "stacked" on molded mounting posts (27), but these posts could be threaded and the boards stacked with spacers, held in place with a nut on top. Another method that could be used to fix and connect various control boards in an alternate embodiment is one similar to control boards in a computer where each board is provided with an edge full of electrical contact pads. The contact pads are basically the male side of a long plug that is pressed into a matching long receptacle. None of these fastening and connecting means should be construed as limiting the scope of the present embodiment.

With further reference to FIG. 12, control boards (24), (25) and (26) are shown generally as printed circuit boards of conventional construction but are representative only of the present embodiment, and will be reduced in size and built with the most modern methods in commercial versions of the present embodiment. Control board (24) serves in this embodiment to provide timed, regulated power, and operation commands to laser (28), and motor (29). Control board (24) further provides interface and control of passive infrared module (90—omitted here for clarity but shown in FIG. 13). Receiver Board (25) receives triggering pulses from trigger module (60—not shown in this view) more specifically, from transmitter (23—not shown in this view) and communicates said trigger pulse to control board (24), which sends signals to control the speed and direction of motor (29) and regulated power to laser (28).

With continued reference to FIG. 12, voice record/playback board (26) records user voice commands digitally for playback via loudspeaker (31). Voice record/playback board (26) also comprises programmed timing functions that allow users to pre-set play periods and annunciate said periods to alert pets to the availability of the device. Other boards may be added into the stack or removed therefrom depending on marketing considerations and cost.

Also in reference to FIG. 12, a highly collimated light source is provided, such as laser (28), however, any suitable light source that projects a visible dot onto a pet's play area may be provided. In the present embodiment, a class 111a diode laser is provided but should not be construed as to limit the scope of the present embodiment. Laser (28) is fixed in place with suitable mounting means (not shown for clarity) and fires its beam (21) onto a highly reflective surface, such as mirror (30), which is fixed to the shaft of motor (29). Mirror (30) in the present embodiment is plastic, coated with reflective mylar, but could be any highly reflective surface.

Continuing to reference FIG. 12, mirror (30) is fixed at an angle sufficient to project laser beam (21) through aperture (44) and thence onto a pet play area. Aperture (44) is fixed at an appropriate diameter large enough to pass laser beam (21) and is covered with a transparent material such as clear acrylic or glass. The turning shaft of motor (29) causes laser beam (21) to project in a generally circular pattern, the diameter of which depends on the height that the laser control module is suspended above the play area. A mirror tilting or gimbal system could be provided but due to complexity and cost considerations a much simpler and trouble free rotating mirror is provided in the present embodiment.

Still referencing FIG. 12, control board (24) provides direction, speed, and duration commands to motor (29). Speed and direction is calculated from study to provide an enticing motion to the laser dot pattern as presented in the pet play area. Motor (29) in the present embodiment is a low voltage DC electric motor and is operated at slow speed via pulse width modulation. This method allows reasonable revolutions per minute, slow enough for pets to chase, and allows the motor to run quietly. Adding an additional motor and an associated mirror in an alternate embodiment will allow any pattern to be produced in the pet play area, including a straight line, a zig-zag line, or any other desired shape. Also in FIG. 12, a conventional battery compartment cover (32) opens to receive batteries (33) or another suitable power source.

Figure 13:
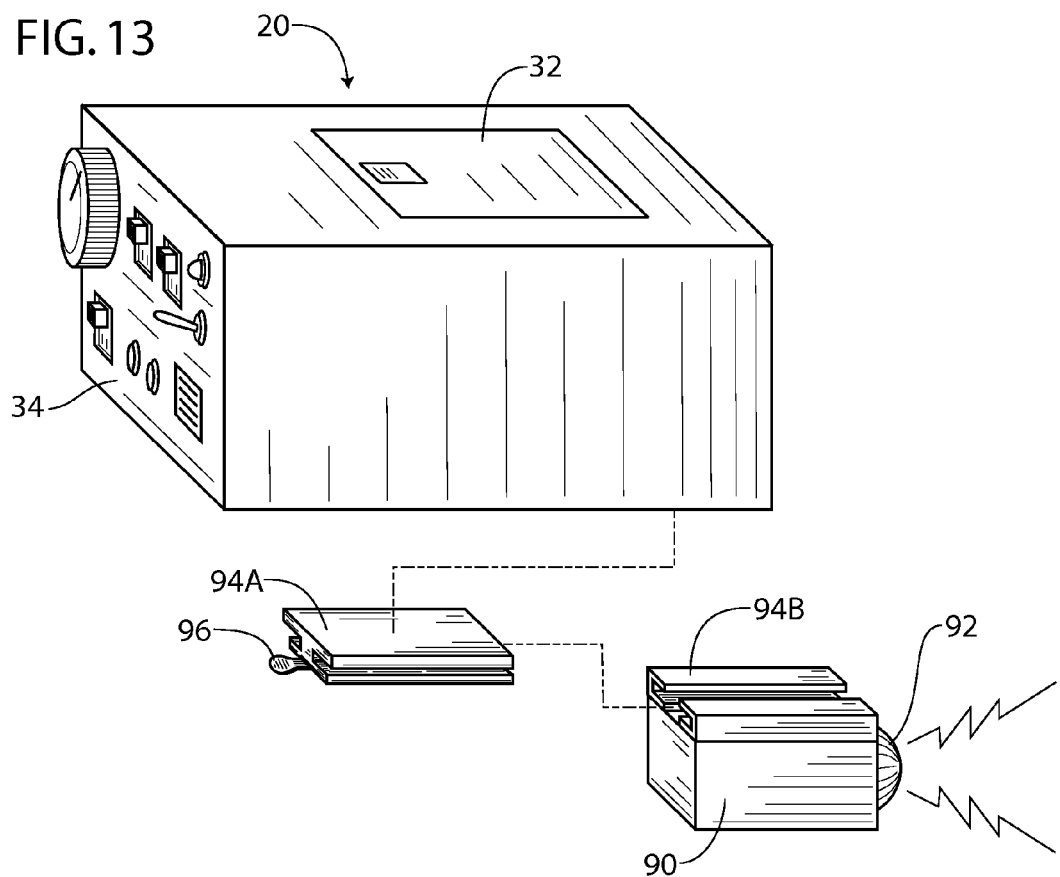
FIG. 13 shows a perspective view of the laser control module with a control panel and associated passive infrared detector with mounting system.

FIG. 13 is a perspective view of laser control module (20) showing battery cover (32) and a control panel (34). Also shown is a passive infrared module (90) and its mounting system. Mounting rail—male (94A) is fixed with adhesive or other suitable means to the housing of laser control module (20). Mounting rail—female (94B) is fixed to passive infrared module (9) with adhesive or other suitable means and is received into mounting rail—male (94A) and snaps into place by engaging a conventional leaf spring type catch lever (96). Other systems may be used to affix passive infrared module (90) to laser control module (20) and this particular module is representative of the present embodiment but not intended to limit scope. A conventional passive infrared lens (92) is provided to control the size and shape of the sensing area that generally corresponds to the pet play area.

Figure 14:
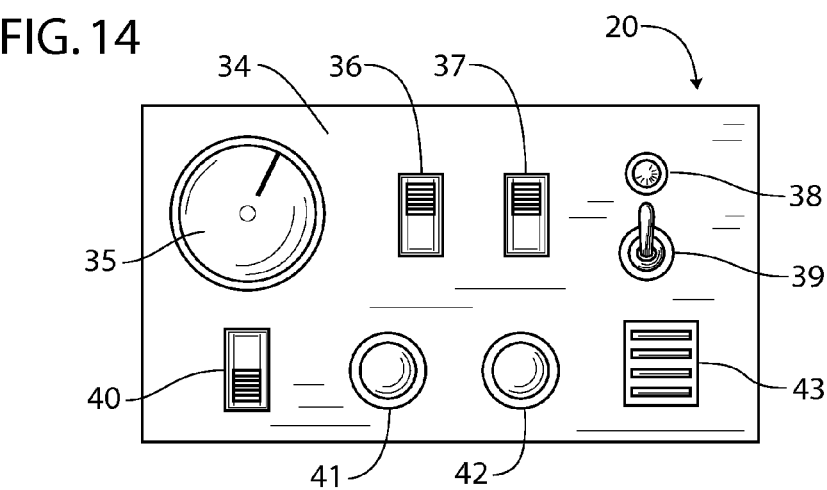
FIG. 14 shows a side elevation view of the control panel.

FIG. 14 is a side elevation view of a representative control panel (34) of laser control module (20), which allows basic user programming. Session timer control knob (35) allows users to select the period of play per trigger pulse. Species slide switch (36) allows users to select between dog and cat in the present embodiment. Control for additional species, such as ferrets or rats, is contemplated in alternate embodiments. Age slide switch (37) allows users to select between young and old pets and provides a slower speed of the laser dot pattern for older pets. Light emitting diode (38) is an "on" indicator, showing when power is provided to the system, and activated by main power switch (39), shown as a toggle switch in the present embodiment. An alternate embodiment (described in detail in its own heading) eliminates the power drain of an "on" energized system in favor of a system that co-locates the "on" switch with the trigger module switch. Performance routine selector switch (40) allows users to select between two performance routines. The present embodiment contemplates one routine as a 15-minute play period per hour and a second routine as a 30-minute play period every two hours. Of course, these routines will be adjusted with experience and alternate embodiments are contemplated that will allow users to define their own routines, directly through a panel mounted control system or even remotely via a personal data assistant, cell phone, or personal computer.

With continued reference to FIG. 14, record push button (41) allows users to record a voice command to call pets to play. Playback push button (42) allows users to listen to a recorded voice command for verification. Microphone (43) is provided to capture the user's voice for recording. The prototype embodiment incorporates an "on" switch (39) and a session timer control knob (35) as well as other controls. None of the controls provided in the present embodiment are essential as everything can be preset and cost or other considerations may define the end product.

Operation—FIGS. 1-14

Experience has shown us that virtually any pet that can learn to respond to voice commands, or be trained to use a litter box, or communicate a desire for food, can be trained to press a trigger switch. With suitable encouragement, and repetitious practice, a dog learns triggering behavior in three or four hours. A cat seems to require two or three days (other pets have yet to be tested). Attractors, such as a favorite chew toy, or a catnip plush toy, for example, may be affixed to trigger module top half (65A) to entice a pet to make contact with the trigger. Caretakers can also press the switch for the pet to show the relationship between trigger module (60) and laser control module (20). In the present embodiment, the caretaker is also provided with a handheld remote transmitter (not shown) to aid in training and to allow the caretaker to engage in play when at home.

When a pet presses the trigger module top half (65A), springs (73) compress allowing contact ring (lower) (68) and contact ring (upper) (69) to touch, completing an electrical circuit with transmitter (23) through wires (46), (47), and (48). Subsequently, conventional transmitter (23) sends a trigger pulse to laser control module (20) initiating a user-preset period of play. Thus, an effective interface is created between a pet and a device. We have learned from experimentation that after a period of a few days, pets enjoy triggering the laser as much as chasing the projected dot, so short operating times per trigger actuation seem to be better than longer ones. In the present embodiment we set the play periods from five seconds to 25 seconds and the pet enjoys actuating the trigger over and over. That method keeps the pet interested, entertained, exercised, and mentally stimulated, much better than long play sessions. Each trigger actuation play period is set by session timer control knob (35) as shown in FIGS. 13 and 14.

Laser control module (20) is suspended above a pet play area with conventional clamping means (not shown) and may be affixed to a curtain rod, door, fireplace mantle, or any convenient mounting surface. The higher the mounting place the larger the diameter of the play area. An alternate embodiment is contemplated whereby the angle of reflection between laser (28) and mirror (30) can be user controlled to adjust the diameter of dot path (22 from FIG. 1).

Laser control module (20) receives the trigger pulse from transmitter (23) and activates laser (28) and motor (29). Laser beam (21) is reflected off of the now spinning mirror (30), which is fixed to the shaft of motor (29). Laser beam (21) exits aperture (44) and projects a visible dot onto the surface of a pet play area. The visible dot moves in a circular pattern and changes direction periodically according to preset and user-set parameters. After the period has timed out, the system resets automatically and the pet may trigger at will another period of play by again pressing trigger module top half (65A).

The domed disk shaped trigger module (60) has evolved to this embodiment from a wedge-of-cheese shape through experience gained with prototype embodiments. The disk shape allows a pet to actuate trigger module (60) from any direction and the dome shape presents a smooth surface that is difficult for pets to bite or scratch as well as allowing sufficient internal space for components such as transmitter (23) and ballast tank (80). Transmitter (23) is conventional and a detailed discussion of its operation is not included in this specification.

Laser control module (20) receives the transmitted trigger pulse and converts the pulse into control signals to operate motor (29) (or motors in contemplated alternate embodiments) and laser (28).

Power for laser (28) motor (29) and printed circuit boards (24, 25 & 26) derives from conventional storage cell batteries (33), however, other power sources could be used, such as solar, or "wall bud" type alternating current adapters. Batteries (33) are removably secured within a portion of laser control module (20) housing by a conventional battery compartment with associated conventional electrical connectors (not shown). Batteries are accessed for installation and replacement via battery cover (32), which is also conventional in its design and operation.

Also provided in this embodiment is a pet/device interface method of passively triggering a play period with a proximity sensor, such as passive infrared module (90). As some pets may not learn triggering behavior, or not be effectively trained to trigger by their caretaker, a pet entering the play area is enough to trigger a play period. Passive infrared module (90) is attached to laser control module (20) housing with a rail system (94A & 94B) incorporating electrical contacts (not shown) to automatically switch to passive mode. Receiver board (25) is bypassed and a pet simply needs to enter the play area to trigger a play period. Pets that have an interest in chasing a laser dot also learn such behavior quickly. After testing, we believe almost any pet will learn triggering behavior and be able to press the contact surface of trigger module (60), however, a passive means is provided for the small percentage of pets that do not actively trigger.

FIGS. 15-18—Alternate Embodiment 1

An alternate embodiment is shown in FIGS. 15 through 18 and in each case details an incorporated support means for laser control module (20—not shown in these views). The present embodiment separates laser control module (20—not shown in these views) via radio remote control from trigger module (60). Alternate embodiment 1 considers cost and other issues to provide alternate means of communication between trigger module (60) and laser control module (20—not shown in these views) that is not dependent on remote control such as radio.

Having electrical wire strung along the floor and up a wall to laser control module (20—not shown in these views) is impractical and presents a hazard to humans and pets alike. Accordingly, alternate embodiment 1 is provided to keep the laser above and away from the pet but still be electrically connected directly to trigger module (60). Location of laser control module (20—not shown in these views) is important because keeping it above a play area causes the pet to be looking at the moving light dot on the floor of the play area, in the opposite direction of the origin of laser beam (21—not shown in these views), thereby preventing hazardous eye exposure. Further, keeping laser control module (20—not shown in these views) as far away as practicable is important to minimize noise that may attract the pet, causing the pet to look into laser beam (21—not shown in these views).

Figure 15:
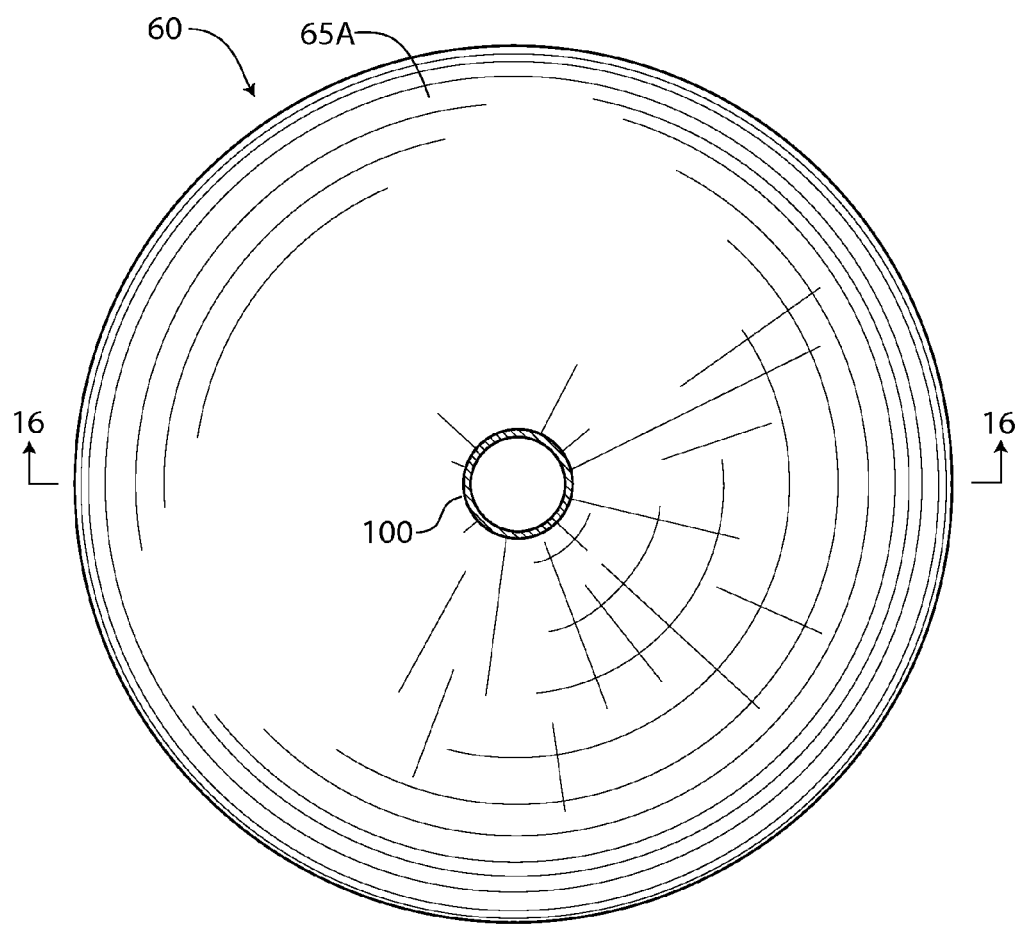
FIG. 15 shows a plan view of the trigger module with associated cross section of a vertical support tube, or pole (100) as an alternate embodiment for mounting the laser control module.

FIG. 15 is an overhead plan view of trigger module (60) showing section line 16 in order to clearly reference FIG. 16. Vertical support tube, or pole (100) is shown in cross section and is further described in FIG. 16. Vertical support pole (100) represents an alternate embodiment in that it allows the laser control head to be attached by suitable conventional clamping means (not shown) to vertical support pole (100) instead of in a more remote location, such as a curtain rod or fireplace mantle.

FIG. 16 is a side elevation view of the sectioned trigger module (60) showing the vertical support pole system. Vertical support pole bottom half (100A) is received in the center of trigger module (60) via holes molded or machined into trigger module top half (65A), ballast tank (80), and trigger module bottom half (65B). Vertical support pole bottom half (100A) is threaded on its bottom end to receive threaded plug (106). The hole in trigger module bottom half (65B) is of such diameter that vertical support pole bottom half (100A) is prevented from passing through, but the hole is big enough to allow threaded plug (106) to be secured in vertical support pole bottom half (100A), effectively fastening vertical support pole bottom half (100A) to trigger module bottom half (65B). Electrical plug—male (108A) is provided to allow electrical connection to trigger module contact rings (68 & 69) via electrical plug—female (110). Means for securing vertical support pole bottom half (100A) to vertical support pole top half (100B), such as a conventional spring catch may be provided to prevent inadvertent separation of the vertical pole but is not shown in FIG. 16 for clarity. Vertical support pole top half (100B) is received into vertical support pole bottom half (100A) with a male/female plug detailed in FIG. 18.

With further reference to FIG. 16, vertical support pole top half (100B) is provided with connecting wires ending in male plug (108B) to complete an electrical circuit with laser control module (20—not shown in this view). Laser control module (20—not shown in this view) is clamped to the top end of vertical support pole top half (100B) with conventional clamping means (not shown).

The vertical support pole system (100A & 100B) is provided in two parts for convenient packaging and shipping considerations but can be made as one piece. The length of the vertical support pole (100A & 100B) in its assembled condition is 36 inches in the present embodiment but can be made any practical length. The main consideration for the length of the pole is to keep it above the play area so that pets are less distracted by sounds of operation and so that a high angle of projection causes pets to look at the dot on the floor of the play area, in the opposite direction of the origin of the laser beam, to reduce the potential for direct eye exposure.

With additional reference to FIG. 16, callout circle (18) defines the area of detail shown in FIG. 18.

FIG. 17 is an enlarged, exploded, perspective view of the fastening system that mates vertical support pole bottom half (100A) to trigger module (60—not shown in this view) via threaded plug (106). This system is described in detail above. Also shown in FIG. 17 is electrical connecting plug—male (108A), which is provided to allow electrical connection with electrical plug—female (110) of FIG. 16.

FIG. 18 is an enlarged, exploded, partially cutaway perspective view of the area defined by callow circle (18) from FIG. 16 and shows the connecting system for mating vertical support pole bottom half (100A) to vertical support pole top half (100B).

Further referencing FIG. 18, male plug (101A) is fashioned by molding or otherwise inserting electrically conductive pins (101B) into a plastic cylinder thence fixing it with adhesive or press fitting it into a swaged portion of vertical support pole top half (100B). The diameter of the swaged portion of the vertical support pole top half is crafted to fit snugly into the top portion of the support pole bottom half (100A). A conventional spring button latch (104) is provided to prevent the support pole from separating inadvertently.

Continuing with reference to FIG. 18, female plug (103) is fashioned similarly to male plug (101) but with female counterparts, or tubes, to receive pins (101B) of male plug (101A) in order to provide a secure, electrically conductive connection. Both plugs (101A & 103) are electrically connected to plugs (108A & 108B from FIG. 16, not shown in this view) via wires with conventional means, such as soldering or mechanical connectors (102) as shown. Female plug (103) is fixed in place with adhesive or mechanical means, such as a screw (not shown), into vertical support pole bottom half (100A) to prevent female plug (103) from being pushed further in or pulled out when connection is made or broken by a user.

Additionally in FIG. 18, a hole (105) in vertical support pole (100A) receives the head of spring button (104) to aid in alignment and to secure vertical pole top half (100B) to vertical pole bottom half (100A). This method of physically and electrically connecting vertical pole bottom half (100A) and vertical support pole top half (100B) is not intended to limit the scope of the embodiment and other means may be used to connect said support poles.

Operation—Alternate Embodiment 1

Receiver board (25—from FIG. 12) is omitted in this embodiment, as there is no transmitter (23—from FIG. 5). This alternate embodiment uses direct wire connection from trigger module (60) to laser control module (20 not shown in these views). Thus, alternate means for transmitting electrical pulses from trigger module (60) to laser control module (20 not shown in these views) are provided. Also, since there is no radio frequency transmitter, an alternate control board, to enhance or replace control board (24—from FIG. 12), can be used to maximize battery life.

Motor speed control is accomplished in this alternate embodiment with a conventional timer integrated circuit (IC) set up as a pulse width modulator running at about 2 KHz. The frequency is low so as to not distract the pet with noise, but different frequencies may be used.

A complimentary metal-oxide semiconductor (CMOS) version of the timing IC draws little overhead current and allows the circuit to continue to operate down to about 2 volts.

A hexagonal field effect transistor (HEXFET) drives motor (29 from FIG. 12) since the HEXFET has a gate threshold of 2 volts to enable it to utilize battery power to a maximum extent.

Pulse width is controlled by a panel-mounted potentiometer to enable user control of the motor speed. Alternately, a printed circuit board surface mount trimmer potentiometer may be used for a factory-preset speed. Cost considerations will determine which method is used in commercial versions.

Also incorporated into alternate embodiment 1, as an improved method of operation of otherwise conventional circuitry, is a "latching" session timer. This circuit is only powered when a pet actuates the trigger module (60). The trigger module (60) is basically a unique large push button (normally open, momentary closed) and operates in this circuit as a "START" switch. No electrical current moves until a pet pushes trigger module top half (65) initiating contact between batteries (33) and control board (24). This sudden pulse of current activates a relay that immediately triggers the timer. The timer then provides power to the relay to keep the circuit active during the timing period.

When the timed period ends, the relay drops out and the battery connection is lost, returning the circuit to its original quiescent state. No current is being used until the pet again actuates the trigger module (60). In this alternate embodiment, there will be no need for a user operable on/off switch (39 from FIG. 14) as trigger module (60) serves as the on/off switch. Battery power is preserved during inactive periods without the need for user intervention.

Once a pet actuates trigger module (60), operation is basically the same as the present embodiment described above with the exception that laser control module (20—not shown in these views) is mounted on a pole attached to trigger module (60).

Figure 19:
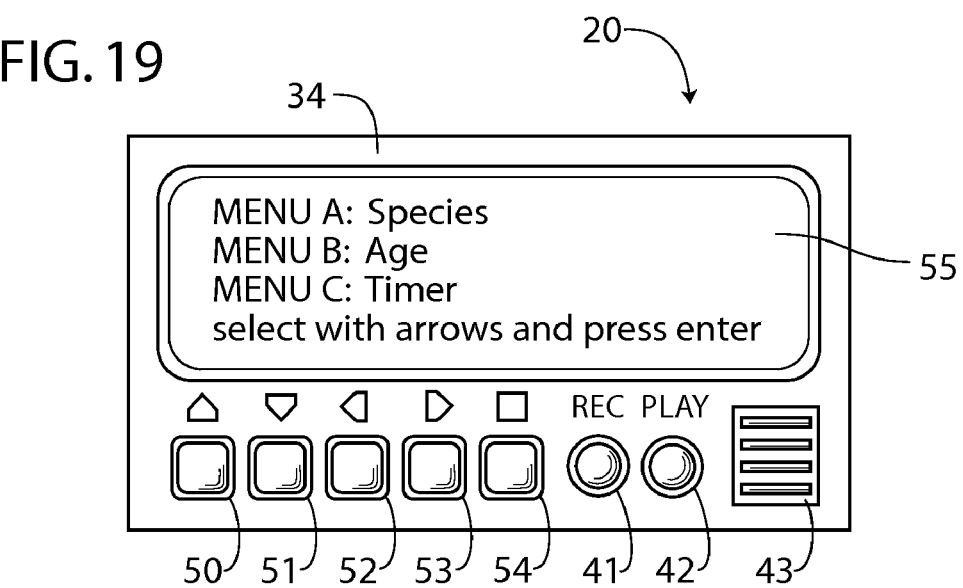
FIG. 19 is a side elevation view of an alternate embodiment control panel.

FIG. 19 Additional Embodiment

There are various possibilities with regard to the relative disposition of the control panel (34). One such possibility is shown in FIG. 19 as an additional embodiment and allows greater programming capability. In this additional embodiment a display screen (55) is provided. Display screen (55) can be liquid crystal or any other suitable display that allows users to see and select various menu items.

With continued reference to FIG. 19, a row of pressure sensitive buttons are provided to navigate the menus and are comprised of a scroll UP button (50), scroll DOWN button (51), scroll LEFT button (52), scroll RIGHT button (53), and an ENTER button (54). Additionally, record (41) and play (42) buttons are provided to allow users to record, through microphone (43), and playback voice commands that will be incorporated into a play period annunciation system. It is contemplated that eventually voice recognition control will evolve past the need for button-based control so nothing in this additional embodiment should be construed as to limit the scope of any embodiments. A microprocessor board will communicate between user inputs and the motor(s)/laser to provide control.

Advantages

From the description above, a number of advantages of some embodiments of our device become evident:
(a) Human attendance or monitoring of pet play is not required.
(b) The pet learns triggering behavior.
(c) Pet eye exposure is minimized.
(d) Remotely mounting the light source prevents approach by pets.
(e) Low speed motor is quiet.
(f) User settable controls are incorporated.
(g) Design minimizes the hazards associated with chewing.
(h) Design minimizes the possibility of pets carrying off the device.
(i) Passive actuation is possible with IR sensor.
(j) Multiple species are provided for.
(k) Pet age is provided for.
(l) Learned triggering behavior is transferable to other devices.
(m) Pet health and happiness is maintained in the absence of a caretaker.
(n) Caretaker anxiety is reduced.
(o) Provides mental stimulation for pets that minimizes destructive behavior.
(p) A simple interface between a pet and a device is provided.

Conclusion, Ramifications, and Scope

Accordingly, the reader will see that the embodiments satisfy the need for providing a simple interface between a pet and a device for exercise, entertainment, mental stimulation, and education of pets, regardless of the presence or absence of their human caretakers. The embodiments provide pet caretakers the comfort of knowing they are taking better care of their pets. Pets will become healthier, happier, and live better lives by intentionally engaging in less sedentary practices while their humans are at work or absent in other respects. Pet caretakers will better care for their pets and pets will better care for themselves.

Furthermore, the device will:
Prevent pet eye injury by utilizing a high angle of projection;
Greatly reduce potential pet internal injury or possible death with a heavy, difficult to move (or chew) trigger module.
Teach triggering behavior that will extend to other toys as well as other useful devices such as pet doors or feeding stations, for example.
Relieve the tension of human caretakers who fret about their pets being home alone all day.

Although the description above contains much specificity, this should not be construed as limiting the scope of the embodiments but as merely providing illustrations of some of several embodiments. For example, the modules can have other shapes, and there can be other methods of triggering, or various collimated light sources, power configurations, colors, and textures. There can be different motors and modes of controlling them, such as remote programming. There can be remote communication with the pet via voice and/or video. With pets learning triggering behavior it is even possible for pets to initiate communication with absent human caretakers.

Thus, the scope of the embodiments should be determined by the appended claims and their legal equivalents, rather than by the examples given.

We claim:

1. An apparatus comprising:
a switch, said switch comprising a top half and a bottom half, said top half having a hemispherical shape and a contact surface arranged to actuate said switch when said contact surface is pressed by a pet, said top half having an electrically conductive material disposed on an inner surface providing one pole of said switch;
said bottom half comprising an electrically conductive material disposed on a mating surface providing an opposite pole of said switch, wherein said bottom half is covered by said top half and both halves are configured to achieve electrical contact when said pet pushes on said top half;
a means for sending a signal from said switch to a controlling device upon actuation of said switch by said pet; and
a highly collimated light dot projection device comprising
an electrical power source,
a motor,
a laser,
a mirror,
a receiver for receiving the signal transmitted from said switch; and
an electronic controller,
wherein said electronic controller causes said mirror to reflect a light dot onto a pet play area in response to the signal.

2. The apparatus of claim 1 further comprising an infrared module configured to detect the presence of a pet.

3. The apparatus of claim 2, wherein said electronic controller is activated by a signal from the infrared module configured to detect the presence of a pet.

4. The apparatus of claim 1 wherein said pet play area is substantially circular.

5. The apparatus of claim 1 wherein said laser dot is directed to move around said switch.

6. The apparatus of claim 1, further comprising a means of attaching said mirror directly to a shaft of said motor to movably reflect said laser dot onto the pet play area.

7. The apparatus of claim 1, further comprising a clamping means for attaching said laser dot projection device to an integral post, or to a separate curtain rod, mantle, door, or any convenient attachment point that is sufficiently high above said pet play area to create a high angle of projection, thereby substantially minimizing exposure of said pet's eyes to said moving laser dot.

8. The apparatus of claim 1, further comprising:
   a control panel which allows human access to basic programming, including session timing length and said motor speed.

9. The apparatus of claim 1, wherein said signal is a radio signal.

10. The apparatus of claim 1, wherein said signal is an electric signal.

\* \* \* \* \*